United States Patent
Cakici

(10) Patent No.: US 11,203,303 B2
(45) Date of Patent: Dec. 21, 2021

(54) FASTENING DEVICE FOR A LOAD CARRIER

(71) Applicant: WESTFALIA-AUTOMOTIVE GMBH, Rheda-Wiedenbrück (DE)

(72) Inventor: Hakan Cakici, Gütersloh (DE)

(73) Assignee: WESTFALIA-AUTOMOTIVE GMBH

(*) Notice: Subject to any disclaimer, the term of this patent is extended or adjusted under 35 U.S.C. 154(b) by 644 days.

(21) Appl. No.: 15/999,747

(22) PCT Filed: Feb. 9, 2017

(86) PCT No.: PCT/EP2017/052819
§ 371 (c)(1),
(2) Date: Aug. 20, 2018

(87) PCT Pub. No.: WO2017/144280
PCT Pub. Date: Aug. 31, 2017

(65) Prior Publication Data
US 2021/0206324 A1    Jul. 8, 2021

(30) Foreign Application Priority Data

Feb. 24, 2016   (DE) .................... 10 2016 103 291.3
Feb. 29, 2016   (DE) .................... 10 2016 103 595.5

(51) Int. Cl.
*B60R 9/06* (2006.01)
*B60R 9/10* (2006.01)
*B60R 9/048* (2006.01)

(52) U.S. Cl.
CPC .............. *B60R 9/06* (2013.01); *B60R 9/10* (2013.01); *B60R 9/048* (2013.01)

(58) Field of Classification Search
CPC ........... F16D 51/00; B60R 9/06; B60R 9/048; B60R 9/10
See application file for complete search history.

(56) References Cited

U.S. PATENT DOCUMENTS 3,662,435 A * 5/1972 Allsop ............... A43C 11/1413
                                                24/70 SK
4,761,898 A * 8/1988 Courvoisier ....... A43C 11/1413
                                                24/68 SK (Continued)

FOREIGN PATENT DOCUMENTS

CN    102458927        5/2012
DE    69711981        10/2002
(Continued)

OTHER PUBLICATIONS

International Search Report dated Apr. 28, 2017; International Application No. PCT/EP2017/052819 filed Feb. 9, 2017; ISA/NL.

(Continued)

*Primary Examiner* — Brian D Nash
(74) *Attorney, Agent, or Firm* — McDonald Hopkins LLC

(57) ABSTRACT

The invention relates to a fastening device (20) for fastening a load to a load carrier of a motor vehicle, wherein, for encircling the load, the fastening device (20) has a holding member (60) which is flexurally flexible at least in sections, with a row of teeth (65), and a holding device (30) for the tension-resistant holding of the holding member (60) with respect to a feed axis, wherein, on a holding base (32) of the holding device (30), a locking element (51) is mounted by means of a locking element bearing (54) so as to be movable between a locking position (R) and a release position (E), wherein, in the locking position (R) for locking the holding member (60) with respect to the holding device (30), the locking element (51) engages in a form-fitting manner with a form-fitting contour (53) in the row of teeth (65) and, in the release position (E), is disengaged from the row of teeth (65), wherein, in the release position (E), the holding member (60) is displaceable along the displacement axis (V) with respect to the holding device (30).

28 Claims, 4 Drawing Sheets

(56) References Cited

U.S. PATENT DOCUMENTS

Figure 4:
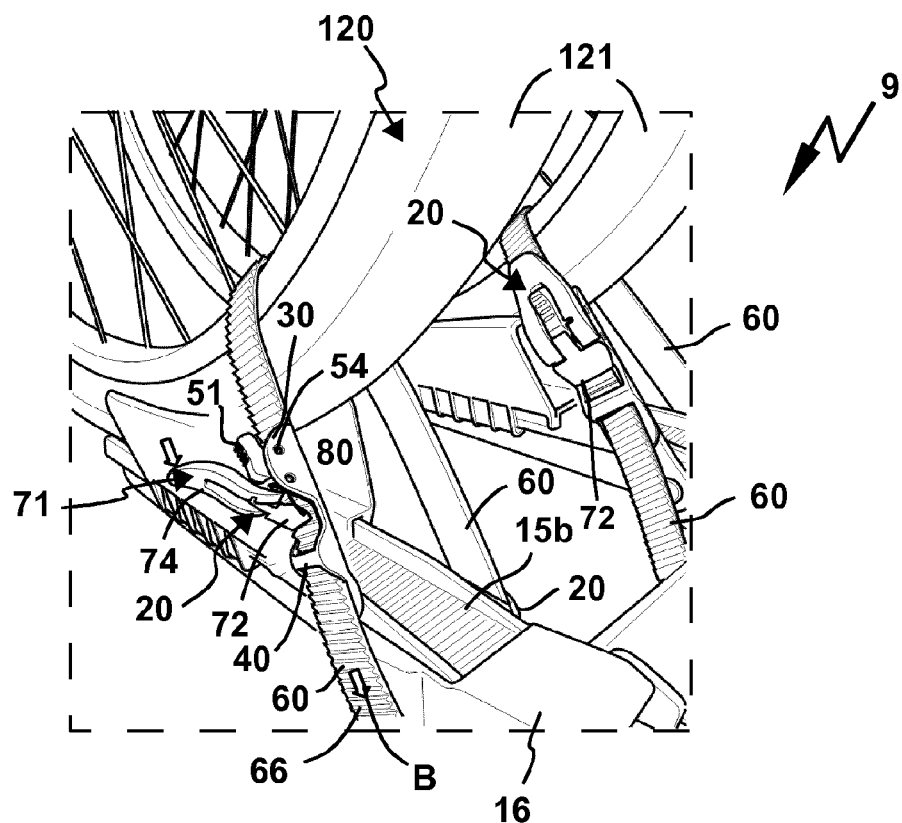

| | | | | |
|---|---|---|---|---|
| 5,570,825 A * | 11/1996 | Cona | ............... | B60R 9/10 224/495 |
| 5,642,555 A | 7/1997 | Lin | | |
| 5,745,959 A * | 5/1998 | Dodge | ............... | A43C 11/00 24/68 SK |
| 5,752,298 A * | 5/1998 | Howell | ............... | A42B 3/166 2/418 |
| 6,283,310 B1 * | 9/2001 | Dean | ............... | B60R 9/048 211/17 |
| 6,425,509 B1 * | 7/2002 | Dean | ............... | B60R 9/048 211/20 |
| 6,431,423 B1 * | 8/2002 | Allen | ............... | B60R 9/048 224/324 |
| 6,554,297 B2 * | 4/2003 | Phillips | ............... | A43C 11/1413 24/68 SK |
| 6,561,398 B1 | 5/2003 | Cole | | |
| 7,392,967 B2 * | 7/2008 | Liaw | ............... | F21V 21/088 248/218.4 |
| 7,401,715 B2 * | 7/2008 | Edgerly | ............... | B60R 9/048 224/42.26 |
| 7,877,845 B2 * | 2/2011 | Signori | ............... | F16B 2/08 24/68 SK |
| 8,505,793 B2 * | 8/2013 | Foley | ............... | B60R 9/10 224/324 |
| 8,763,209 B2 * | 7/2014 | Kavarsky | ............... | A43C 11/142 24/68 SK |
| 8,763,211 B1 * | 7/2014 | Yu | ............... | B60P 7/0823 24/191 |
| 2006/0213941 A1 * | 9/2006 | Sweeney | ............... | B60R 9/048 224/324 |
| 2007/0089945 A1 | 4/2007 | Martignago | | |
| 2007/0119887 A1 * | 5/2007 | Foley | ............... | B60R 9/048 224/324 |
| 2008/0053926 A1 * | 3/2008 | Foley | ............... | B60R 9/048 211/17 |
| 2011/0290840 A1 | 12/2011 | Huang | | |
| 2014/0246467 A1 * | 9/2014 | Hein | ............... | B60R 9/10 224/519 |
| 2017/0066385 A1 * | 3/2017 | Dickinson | ............... | B60R 9/10 |

FOREIGN PATENT DOCUMENTS

| | | |
|---|---|---|
| DE | 102010015652 | 10/2011 |
| DE | 102010015652 A2 | 10/2011 |
| EP | 0572373 | 12/1993 |
| EP | 0606852 | 7/1994 |
| EP | 2014510 | 1/2009 |
| EP | 2014510 B1 | 12/2013 |
| EP | 2730464 A2 | 5/2014 |
| KR | 101474664 | 12/2014 |
| WO | WO0138141 | 5/2001 |

OTHER PUBLICATIONS

State Intellectual Property Office of People's Republic of China, Notification of First Office Action for Application No. 201780013079.3 report dated Jun. 9, 2021, China.

* cited by examiner

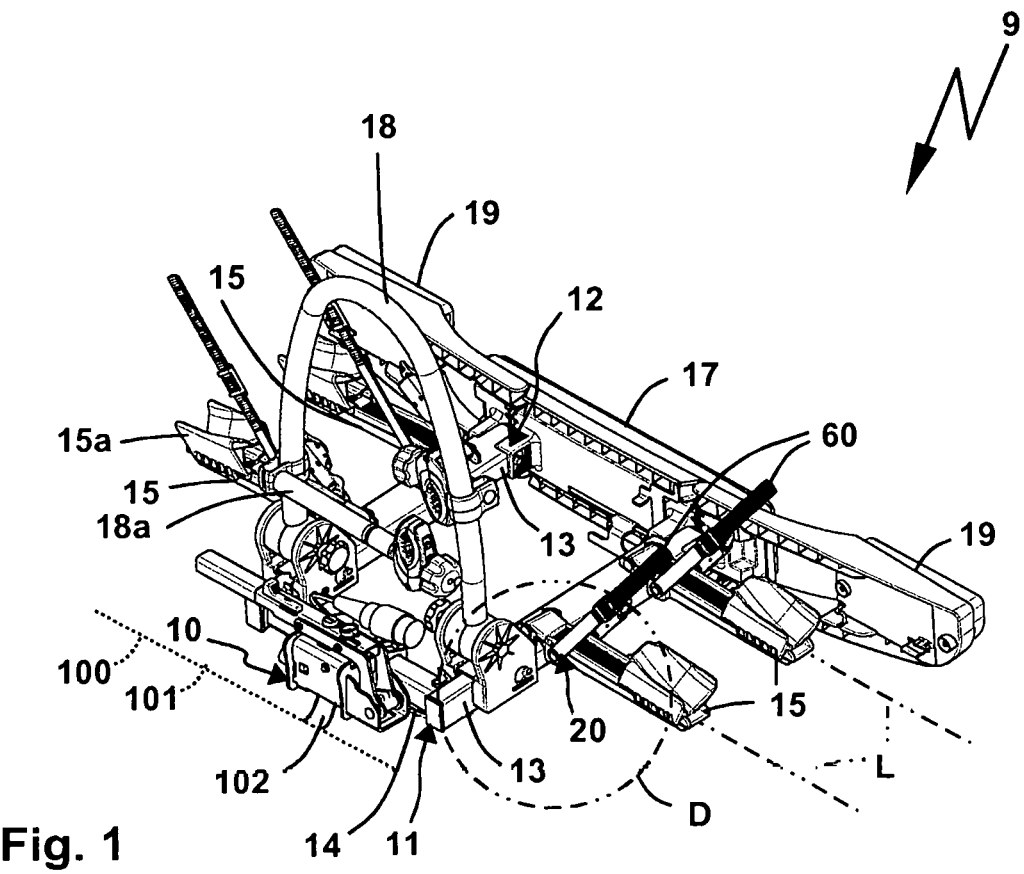
Fig. 1
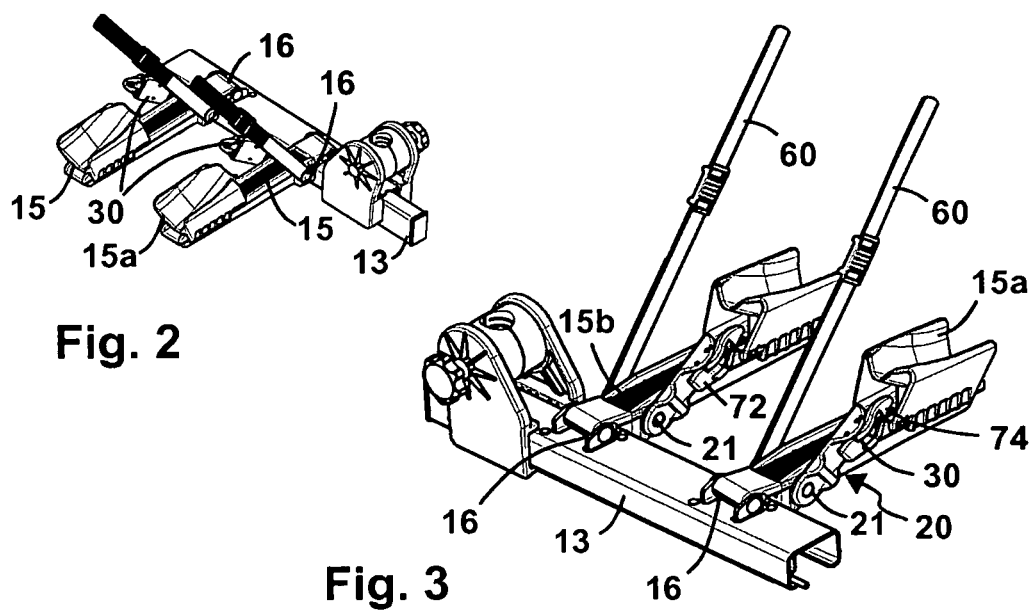
Fig. 2
Fig. 3

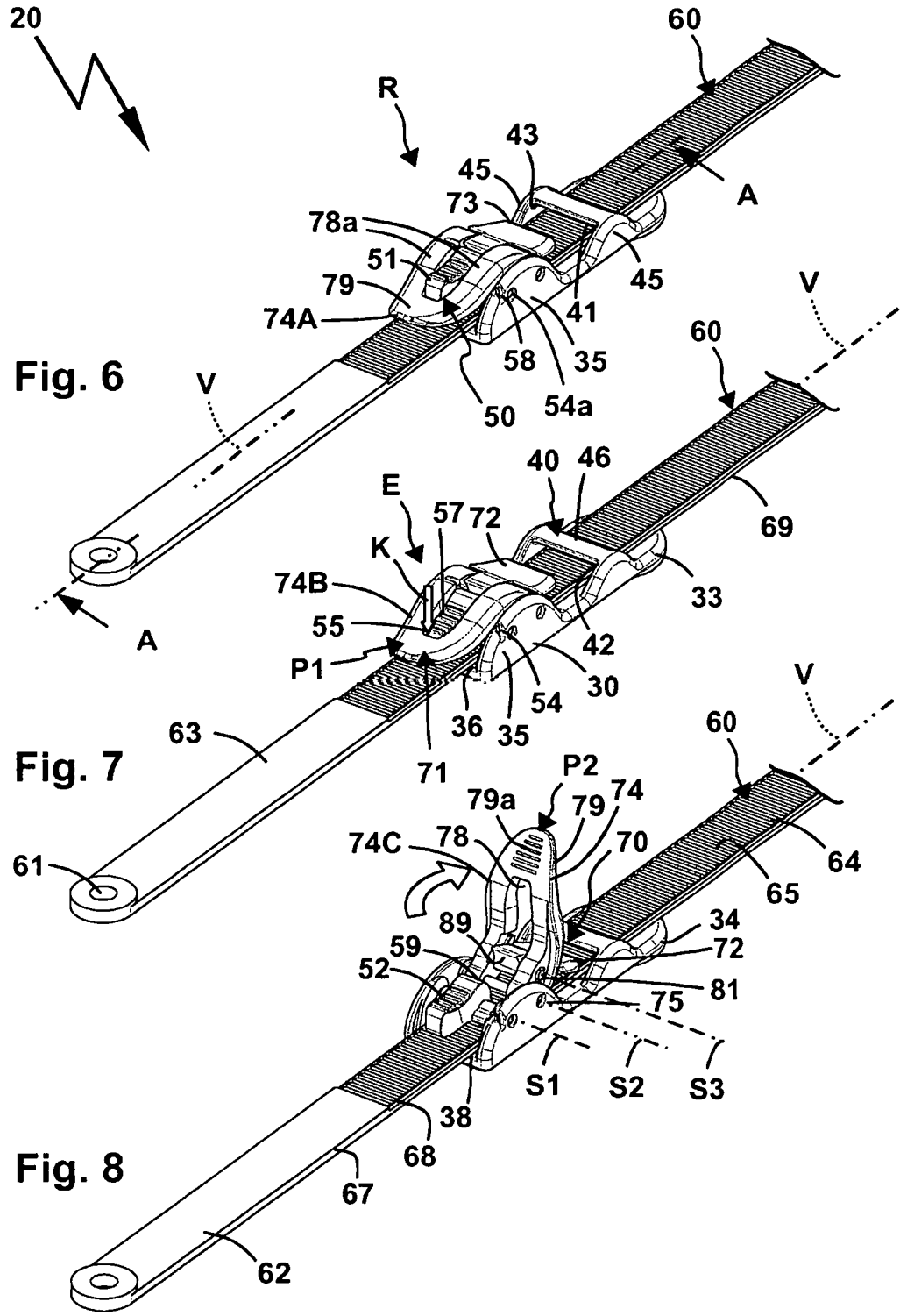

FASTENING DEVICE FOR A LOAD CARRIER

CROSS-REFERENCE TO RELATED APPLICATION

This application is a 35 U.S.C. § 371 national stage application of PCT Application No. PCT/EP2017/052819 filed on Feb. 9, 2017, entitled "FASTENING DEVICE FOR A LOAD CARRIER," which claims priority to German Patent Application No. 102016103291.3, filed on Feb. 24, 2016, and German Patent Application No. 102016103595.5, filed on Feb. 29, 2016, each of which are incorporated herein in their entirety by reference.

The invention relates to a fastening device for fastening a load to a load carrier of a motor vehicle, wherein for encircling the load the fastening device has a holding member which is flexurally flexible at least in sections, with a row of teeth and a holding device for the tension-resistant holding of the holding member with respect to a feed axis, wherein on a holding base of the holding device, a locking element is mounted by means of a locking element bearing so as to be movable between a locking position and a release position, wherein, in the locking position for locking the holding member with respect to the holding device, the locking element engages in a formfitting manner with a formfitting contour in the row of teeth and, in the release position, is disengaged from the row of teeth, wherein in the release position, the holding member is displaceable along the displacement axis.

Such a fastening device is, by way of example, explained in EP 2 014 510 B1. The fastening device is arranged on a base frame of a rear load carrier and serves to clamp a wheel of a bicycle relative to a carrier channel, swivel-mounted on the base frame of the rear load carrier.

On this basis, the problem for the present invention is to provide a more manageable fastening device.

In order to solve the problem, with a fastening device of the abovementioned type, it is provided that in order to feed the holding member along the displacement axis it has a sliding element supported on the holding base of the holding device by means of a sliding element bearing with a translationally moveable drive section in contact with the holding member during a feed movement, and an actuating device having a manual operating area for manual operation of the sliding element.

The actuating device comprises, for example, an actuating element, in particular an actuation slider or an actuation lever. The sliding element is expediently a component that is separate from the actuating device.

It is a basic concept of the present invention that in the area of the holding member, the sliding element performs a translational movement, i.e. a movement along a path running substantially linearly. The sliding element thus performs a sliding movement.

In this way, a longer stroke or a longer adjustment path of the holding member relative to the holding device during the feed movement by means of the sliding element is advantageously possible. Thus, by means of the actuating device, with relatively few operating actions, by way of example swivelling movements of an actuating element of the actuating device, a relatively longer adjustment path of the holding member can be achieved. Thus, by way of example, advancement by 3-5 teeth, in particular three teeth, of the row of teeth is possible with a single actuation stroke of the actuating device.

The holding base is, by way of example, provided with a guide for guiding the holding member. The holding base expediently has a guide channel for the holding member.

It is preferred if the holding base guides the holding member transversally to the displacement axis. By way of example, guide projections or guide contours are provided transversally to the displacement axis. It is particularly advantageous if the holding base guides the holding member on its narrow sides.

By way of example, lead-in chamfers can be provided on the holding base in the direction of the displacement axis.

The holding member is expediently configured at least in the area of the row of teeth as a strap and/or has a flat configuration. Self-evidently, the holding member can have an overall flat configuration. It is also possible for the holding member to have a cross-section other than a rectangular cross-section. Thus, by way of example, a triangular or trapezoidal cross-section of a holding member is perfectly possible, wherein on one side, in particular on a flat side of the holding member, the row of teeth is arranged. It is pointed out here that the holding member does not have to have a flat configuration throughout or be a strap, but can, by way of example, also have sections with a round or polygonal cross section.

The holding member expediently comprises at least in sections a flexurally flexible plastic and/or flexurally flexible metal and/or rubber. Consequently, a hybrid material is also possible. Layers of different material can be placed one on top of the other, in order to form at least a segment of the holding member.

The holding base expediently comprises plastic material and/or metal. The holding base is advantageously substantially flexurally rigid or completely flexurally rigid.

It is in principle also possible that at another point the holding member is not flexurally flexible and/or has another structure and/or another geometry, by way of example having an approximately circular or elliptical cross section.

The row of teeth expediently extends over just one segment of the holding member. However, the holding member can also have a row of teeth along its entire length or substantially its entire length.

A preferred embodiment of the invention provides that the sliding element is configured for an oscillating actuation of the holding member, wherein the drive section of the sliding element at least in engagement with the holding member, i.e. when the drive section actually actuates the holding member, performs a translational feed movement along the displacement axis. It is possible for the drive section of the sliding element during the return movement, and thus counter to the feed movement, to be similarly translationally moveable. However, it is also possible for the drive section of the sliding element, during the return movement, to follow a curved movement path, that is to say, therefore, by way of example to be moved back over the holding member in curves or in a single curve. The curved movement can also have very small bending radii. It is, therefore, by way of example possible for the sliding element during the return movement, to engage with the teeth along the row of teeth and in each case slide in a curved manner across a tooth.

It is advantageously provided that the actuating device has an actuating lever supported, so that it can swivel, on the holding base by means of a lever swivel bearing, on which the sliding element is supported, so that it can swivel, by a sliding element swivel bearing and/or in the form of a paddle. The actuating lever thus swivels, by way of example in an oscillating manner back and forth, wherein the sliding element swivel bearing allows a translational movement of the drive section relative to the actuating lever.

By way of example, the movement is configured so that the swivel axis of the sliding element at the reversing points of the swivelling movement of the actuating lever is at opposing ends of the swivel axis of the actuating lever.

The following measure can improve the ergonomics and/or save space: it is preferably provided that a locking element operating area provided for manual operation, by way of example an actuating arm, actuating protrusion or similar, of the locking element is arranged in or on a space of an actuating element of the actuating device for the sliding element. In this way, for example, it can be provided that an actuating lever supported so that it can swivel on the holding base has such a space in which or on which the locking element operating area is arranged.

The actuating element of the actuating device for the sliding element can advantageously surround a locking element operating area like a frame. By way of example, it is advantageous if an actuating segment of the actuating element for the sliding element with respect to the displacement axis protrudes in front of the locking element operating area. This actuating segment advantageously offers protection against incorrect operation of the locking element operating area.

In the area of the locking element actuating area, the actuating element of the actuating device expediently has a recess or indentation.

A variant of the invention can provide that the actuating device or the sliding element has a coupled movement either side of the locking element. If, therefore, by way of example, the actuating device is actuated for the purpose of feeding the holding member along the displacement axis, it can by way of example through an actuating contour simultaneously actuate the locking element in the release position. It is expediently provided that the holding member can be disengaged for the feed movement by the sliding element and/or the actuating device.

It is also possible for the sliding element and the actuating device not to have a coupled movement, in particular that they move freely relative to one another. Thus, by way of example, it can be provided that the locking element by means of the locking element bearing and the sliding element by means of the sliding element bearing are supported on the holding base of the holding device so that they can move relative to one another. In particular, the sliding element and the locking element have full freedom of movement relative to one another.

Even if the sliding element and the locking element are supported independently of one another with respect to the holding base, meaning that the sliding element bearing and the locking element bearing are separate bearings from one another, in principle a coupled movement, in particular an at least coupled movement, segment by segment, of locking element and sliding element, for example for the purposes of unlocking and/or locking of the locking element by the sliding element or its actuating device, is possible. It is, for example, possible for the locking element and the sliding element to be movable relative to one another, but over a movement segment of locking element or sliding element for one of the locking element or the sliding element to carry the other of the locking element or sliding element with it, meaning that in this movement segment a coupled movement is present.

It is advantageous if the locking element is configured as a locking lever or has a locking lever. By way of example, the locking element has an actuating arm for actuation by an operator and a locking arm, on the free end area of which the form-fitting contour for engaging with the row of teeth is provided.

It is further advantageous if at least one spring arrangement is provided, by way of example in order to place the sliding element or the locking element under load. It is possible for both the sliding element and the locking element to be loaded by a spring arrangement in a predetermined position. The spring arrangement can, by way of example, contain a leg spring, helical spring or also a flexible rubber element, in particular a rubber buffer or similar. Such a spring arrangement can be associated with the locking element or the sliding element. With a leg spring it is advantageous if it extends around a swivel axis of the respective element, of the sliding element or of the locking element, or is passed through by the swivel axis.

It is preferably provided that the sliding element is spring-loaded in the direction of an external engagement position with the holding member by a spring arrangement. It can thus, for example, be provided that the sliding element is spring loaded by the spring arrangement, in particular a helical spring or a leg spring, away from the holding member, thus in particular its row of teeth, so that, by way of example, it does not prevent a feed relative to the locking element or the holding base, if the so to speak rapid feeding by the sliding element is not desired. If the locking element adopts the unlocking position, the holding member can in this case be relatively freely adjusted with respect to the holding base, without this impeding the sliding element. However, it is also possible for the element to be spring loaded for the purposes of holding or in the direction of a locking position. Thus, it is, by way of example conceivable for the sliding element to be loaded by a spring arrangement, in turn by way of example by a leg spring, a helical spring or similar, in a form-fitting or clamping engagement with the holding member. The sliding element can thus, by way of example, form a device, in addition to the locking element, for preventing removal of the holding member or movement of it relative to the holding base.

It is advantageous if the locking element is loaded by a spring arrangement in the direction of the locking position. Thus, the locking element can, by way of example, automatically lock in place, without the operator having to do anything. In the release position, on the other hand, an operator action, by way of example pressing on the locking element for the purpose of releasing the engagement in the row of teeth is advantageous.

It is advantageous if the row of teeth has a sawtooth-like configuration having displacer slants or actuation slants for actuating the sliding element and/or the locking element for the purpose of release or in the direction of an external engagement position in the direction away from the row of teeth. The teeth are thus configured with slanted surfaces or slanted contours which, for example, allow the holding member to move towards the holding device for the purpose of reducing the distance to this. The slanted surfaces or actuating slants expediently run at an angle of 30-60°, in particular approximately 45°, inclined to the displacement axis V.

On the sides opposite the slanted surfaces or actuating slants, the teeth preferably have support edges, on which the locking element or the sliding element can rest. The support edges are preferably approximately at right-angles to the displacement axis. It is also possible that in the area of the support edges engagement indentations, by way of example in the manner of pockets, are present, in which the sliding element or the locking element are able to engage.

It is advantageously provided that the locking element has an actuating contour for actuating the sliding element in a form-fitting engagement or clamping engagement with the holding member. Thus, the locking element, by way of example in the event of excessive loading or for the purpose of additional securing, can load the sliding element in the direction of a position securing or locking the holding member with respect to holding base.

It is preferable, if the locking element can be actuated by the holding member, so that it actuates the sliding element in a form-fitting engagement or clamping engagement with the holding member.

An advantageous embodiment provides for a force amplification for an actuating force of an operator for actuating the actuating device. It is advantageously provided that the actuating device for the force amplification of an actuating force of an operator has a power transmission gear, by way of example a lever assembly or a lever gear, between an actuating area of the actuating device and the drive section of the sliding element. The power transmission gear amplifies, by way of example, an actuating force of the operator during actuation of the drive section. Thus, by way of example, the abovementioned actuating lever and/or the power transmission gear, can work for the purposes of force amplification. At this point, it should be mentioned that obviously an actuating slider or a gear for driving the sliding element can also be provided. For the force transmission gear, however, a toothed gear or gear train or roller gear can also be considered. A rope arrangement or rope gear or a wedge gear can be readily used for the purposes of force transmission and amplification.

It is also advantageous if the holding member is releasably removable from the holding device in the release position of the locking element. Thus, by way of example, the holding member can be removed from the holding device, in order to remove a load from the load carrier.

It is also possible, however, for the holding member of the holding device to be captively retained, by way of example by providing a longitudinal stop on the holding member, preventing removal of the holding member from the holding device. The longitudinal stop strikes by way of example the holding base of the holding device in a longitudinal end position of the holding member. Thus, through the holding device, the length of the holding member can be varied in relation to the load to be fastened, without the holding member having to be completely removed from the holding device.

An independent invention in connection with the features of the preamble to claim 1, is represented by the following measure. However, this measure can also be an advantageous improvement of the invention. In both cases, it is provided that the fastening device has at least one guidance device for the holding member upstream or downstream of the locking element with respect to the displacement axis, which guides the holding member, secured against rotation, with respect to the locking element with respect to the displacement axis. By means of this guidance device, the holding member is held in the area of the locking element and/or in the area of the sliding element in a predetermined rotational position. Therefore, if, by way of example, a force acts on the holding member transversally to the displacement axis and/or a torsional force acts around the displacement axis, this force does not transmit to the locking element or sliding element but is as it were absorbed or intercepted by the guidance device. Thus, the rotational position of the holding member along the displacement axis in the area of the sliding element or the locking element or both is substantially predefined by the guidance device or its guide contour, ensuring an optimal force effect of sliding element or locking element on the holding member. Negative impacts of the holding member on the sliding element or locking element are also considerably reduced or preferably completely eliminated.

It is preferable if the guidance device guides the holding member transversally to the displacement axis. By way of example, it can be provided that the guidance device has a guide channel, the clear internal cross section contour of which corresponds to an external cross section contour of the holding member at least in the area of sections securing against rotation or completely. The external cross section contour of the holding member is expediently an anti-rotation contour or has an anti-rotation contour. By way of example, the external cross section contour is polygonal. The internal cross section contour of the guidance device or of the guide channel can correspond exactly to the external cross section contour of the holding member. However, it is also possible for the internal cross section contour to have only anti-rotationally guiding and/or geometrically matching sections, by way of example in corner areas of the external cross section contour of the holding member. If, by way of example, the holding member has a flat, rectangular cross section, the internal cross section or the internal cross section contour of the guidance device, in particular of the guide channel, is similarly flat and rectangular. Here it may be sufficient for the overall inner cross section to have the flat rectangular design. By way of example, a guide may be provided only on the external corner areas of the external cross section contour of the holding member. It is obviously advantageous if the cross-sectional area of the internal contour and the external contour are practically the same. Nevertheless, a certain movement play between the holding member and the guide contour is necessary.

It is preferable if there is a gap between the guide contour and the holding base. This gap can, for example, serve as a working area for the sliding element. It is expediently provided that the sliding element is arranged or has its working area between the locking element and the guidance device.

The guidance device expediently has at least one guide slant to guide free end areas of the teeth of the row of teeth. The guide slant is provided to impinge on free end areas of the teeth of the row of teeth. The free ends or tips of the teeth thus slide below the guide slant. The effect of the at least one guide slant is, by way of example, to push or guide the holding member in the direction of the floor of the guidance device and/or the holding base. This helps to guide the holding member flat along the floor.

It is preferable if the guidance device is integrally formed with the holding base. By way of example, the holding base has a guide projection, on which the guidance device is arranged.

The guidance device comprises, by way of example, a tunnel or a guide channel for guiding the holding member.

The guide contour of the at least one guidance device can represent or be a circumferentially closed contour. However, it is also possible for the guide contour to have an interruption. It is, by way of example, possible for the guide contour, in the manner of legs at an angle to one another, i.e. by way of example in a U shape, to guide respective side edges of the holding member.

It is possible for at least one guidance device to be, as it were, downstream, i.e. to be in front of the holding base in the direction of the feed movement.

It is advantageously provided that a free end area of the holding member is guided by the guidance device.

But it is also possible for the at least one guidance device to, as it were, be arranged on a side upstream of the holding base. Thus, by way of example, the holding member can be guided or held by the guidance device at the start of the holding device, so that the locking element can perform its locking function to the optimum.

It is, of course, also possible to provide a guidance device either side of the holding base with respect to the displacement axis.

The guidance device preferably has a flexurally flexible connection to the holding base. This allows, by way of example, the guidance device and/or the holding base to virtually cling optimally to the load to be fastened or to take up a curved position for the encircling.

However, a rigid connecting section can also be provided between the at least one guidance device and the holding base. This allows, by way of example, an optimum path of the holding member between the guidance device and the holding base, in particular the components impinging on the holding member there, namely sliding element and/or locking element.

An expedient embodiment of the invention can provide that the fastening device forms a component of a load carrier, in particular of a rear load carrier. The load carrier can, by way of example, be configured as a roof-mounted load carrier for fastening to a vehicle roof of a motor vehicle. The rear load carrier can be fitted to the rear of a motor vehicle, and also of an electric vehicle. By way of example, the rear load carrier can have a load carrier coupling, with which it can be fastened to a trailer coupling of a motor vehicle. However, it is also possible that on the rear of the motor vehicle at least one seat or mounting is provided to hold the rear load carrier.

It is also advantageous if the holding member or the holding device, or both, are fixed or fixable to a support base of a load carrier or another support component of a load carrier for supporting a load by means of fastening means, by way of example a fastening bolt, a rivet or similar. By way of example, the holding device and/or the holding member has a through-opening for passing through such fastening means.

It is also possible, for the holding member and/or the holding device to be fastened to a carrier channel or other support component, movably arranged on a support base of the load carrier.

A variant of the invention already mentioned in connection with the abovementioned prior publication, provides that the holding member and the holding device, i.e. the components of the fastening device detachable from one another, are arranged on a support base, in particular on a carrying frame, of the load carrier. On this support base a support component, by way of example a carrier channel for depositing a bicycle, is movably supported, by way of example between a use position and a non-use position. By attaching the load, by way of example the bicycle, in relation to the support component, the support component itself is immobilised in a relative position to the support base. By way of example, the holding member and the holding device can be arranged in the area of a swivel bearing of such a support component on the support base, in particular the carrying frame, of the load carrier.

It is advantageous, but not absolutely essential, for the fastening device to be a component of a load carrier. In principle it can also be advantageously used in another position and for other purposes. It is also possible for the fastening device to be configured as a loose, as it were, separate component. Thus, by way of example, with the fastening device a load can be fastened to any support. By way of example, the fastening device is suitable for lashing down a load with a support, by way of example a support tube.

Figure 5:
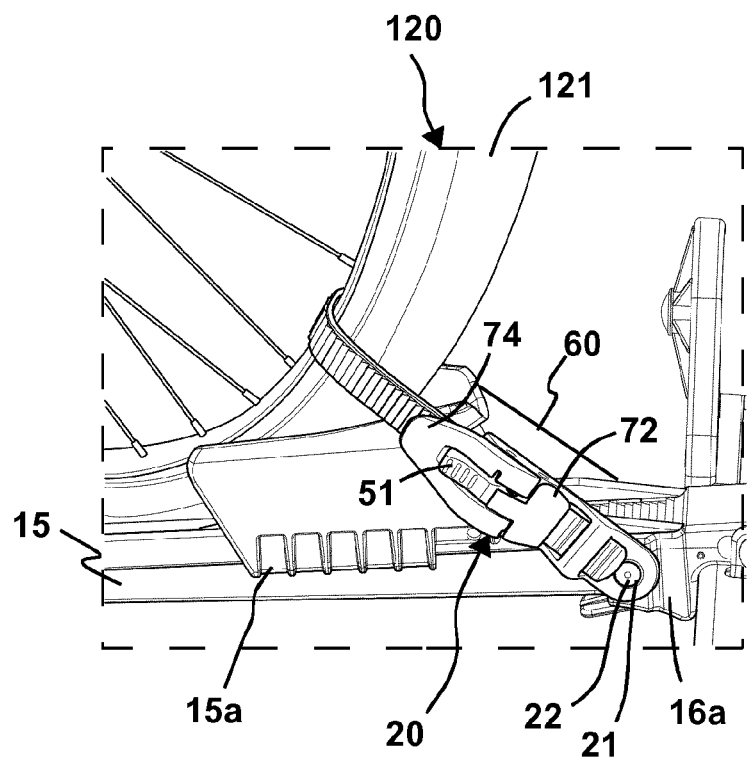
Figure 9:
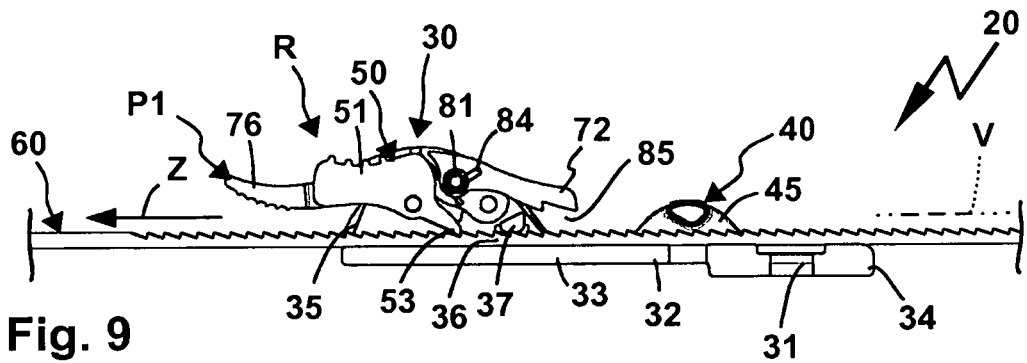
Figure 10:
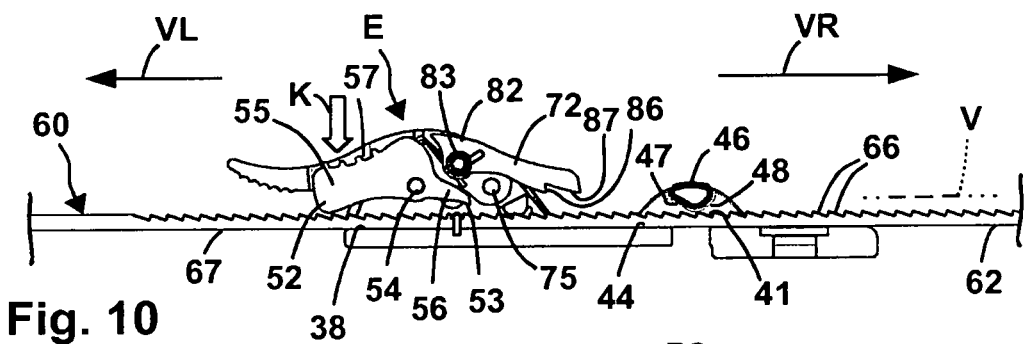
Figure 11:
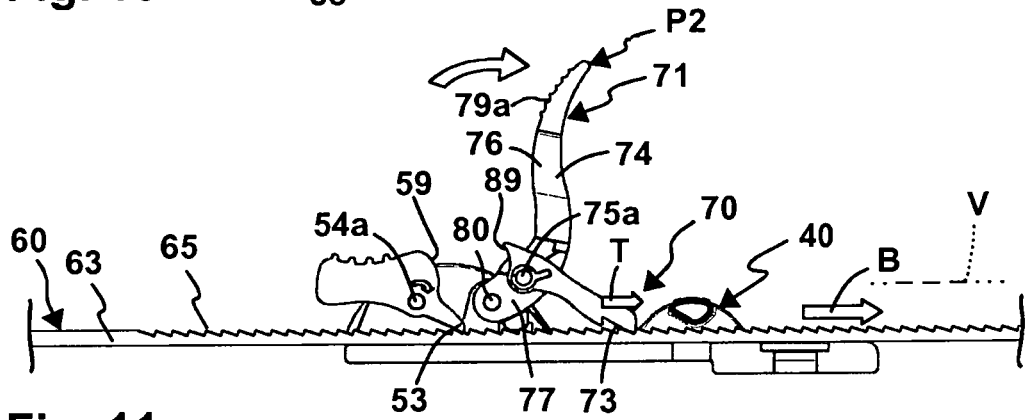
Figure 12:
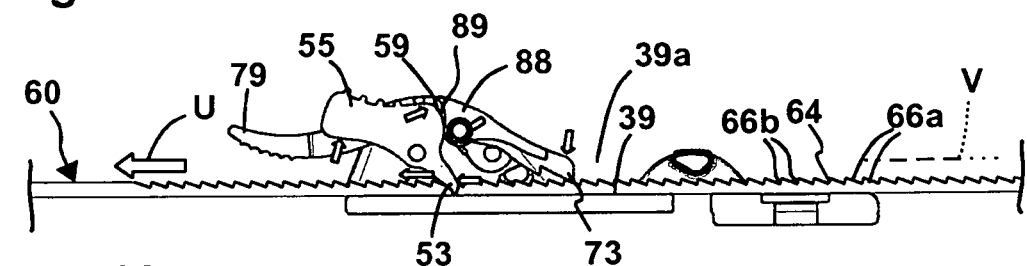

In the following, exemplary embodiments of the invention are explained by means of the drawing. This shows as follows:

FIG. 1 a perspective oblique view of a rear load carrier with fastening devices;

FIG. 2 a perspective oblique view of support components of the rear load carrier according to FIG. 1 with associated fastening devices;

FIG. 3 the bearing components according to FIG. 2, but in perspective view from the other side;

FIG. 4 a perspective oblique view of a detail of the rear load carrier according to the above figures and wheels of a bicycle arranged on the rear load carrier, approximately according to an area D in FIG. 1;

FIG. 5 the detail according to FIG. 4, but frontally from the side;

FIG. 6 one of the fastening devices of the rear load carrier according to the above figures in perspective oblique view in the locking position;

FIG. 7 the fastening device according to FIG. 6, but with the fastening device shifted into the release position;

FIG. 8 the fastening device according to FIGS. 6 and 7, but during a feed movement by a sliding element of the fastening device;

FIG. 9 a sectional view of the fastening device according to FIG. 6, approximately along a line of intersection A-A;

FIG. 10 a cross-section through the fastening device in the position according to FIG. 7, similarly along the line of intersection A-A;

FIG. 11 a cross section through the fastening device in the position according to FIG. 8, similarly along the line of intersection A-A; and FIG. 12 a representation of the fastening device approximately according to FIG. 9, wherein the fastening device is shifted into a wedge position by an excessive loading of the holding member.

A load carrier according to the drawing is, by way of example, configured as a rear load carrier 9, which can be detachably fastened to the rear 101 of a motor vehicle 100. The motor vehicle 100, for example a passenger car, has a trailer coupling 102, or another holding device on which the rear load carrier 9 can be detachably fastened. By way of example, the rear load carrier 9 has a load carrier coupling 10 for fastening to the trailer coupling 102. The load carrier coupling 10 can, by way of example, by means of a spherical head, not visible in the drawing, or another domed part of the trailer coupling 102, be brought into clamping engagement, so that the rear load carrier 9 is securely fastened to the rear 101. When in use, the rear load carrier 9 therefore protrudes behind the rear 101.

A support base 11 of the rear load carrier 9 serves to carry a load, by way of example luggage or in the specific exemplary embodiment bicycles. The support base 11 comprises, by way of example, a carrying frame 12, which is fastened to the load carrier coupling 10. The carrying frame 12 has side members 13, running in the longitudinal direction of the vehicle when the rear load carrier 9 is mounted on the motor vehicle 100. The side members 13 are connected together by a cross member 14, which in turn is fastened to the load carrier coupling 10.

On the side members 13, supporting components 15, by way of example channels, are arranged, on which a load, in particular bicycles, can be deposited. By way of example, the supporting components 15 can be shifted by means of swivel bearings 16 between a use position shown in the drawing, in which they protrude laterally from the side members 13, and a non-use position, in which the supporting components 15 are arranged in a gap between the side members 13. The rear load carrier 9 then requires less space.

On the supporting components 15, fastening devices 20 for fastening a bicycle 120, in particular the wheels 121 of this, are provided.

The load, in particular a respective bicycle can be secured by means of a support. The support 18 comprises, by way of example, a U-bolt, protruding at an angle from the carrying frame 12 in the use position (shown as such in the drawing), but advantageously still in the direction of the carrying frame 12, in particular the side members 13, but able to be shifted when not in use. On the support 18, by way of example adjustable supporting arms are provided for supporting a load, in particular a bicycle.

The cross member 14 extends between the side members 13 and is also opposite a number plate holder 17, connecting the side members 13. On the number plate holder 17, lights 19 are arranged to provide rear lighting of the rear load carrier 9. The lights 19 can advantageously be swivelled by means of swivel bearings not shown in more detail between a use position approximately in alignment with the number plate holder and a non-use position out of alignment with the side members 13.

On the supporting components 15 supports 15a are also provided to support the wheels 121 of the bicycle 120. The supports 15a can be displaced longitudinally on the supporting components 15 in relation to their longitudinal axis L and are lockable in at least two longitudinal positions with respect to the longitudinal axis L on the supporting components 15 by means of a clamping device or detent device, not visible in detail. By way of example, the detent device latches with teeth 15b on the supporting components 15. It is preferably provided that the supporting components 15 can also be immobilised relative to the carrying frame 12 or the support base 11 in the use position, by way of example by means of holding devices, in particular detent devices 16a.

Stable retention of the wheels 121 of a bicycle 120 is thus already ensured. Ease of use of the rear load carrier 9 and in particular also safety in the event of excessive loading, by way of example in the event of an accident or a particularly strong force, is allowed by the fastening devices 20 explained in detail in the following.

The fastening devices 20 comprise holding devices 30 and flexurally flexible holding members 60, which are secured by means of fastening means 21 to the support base 11, in this case by way of example to the supporting components 15. Obviously, the securing of a respective fastening device 20 to another point of the support base 11 is, by way of example, also possible directly on the carrying frame 12, for example the side members 13. The fastening means 21 comprise, by way of example, bolts 22, with which the holding members 60 and the holding devices 30 are fastened to the supporting components 15. The bolts 22 are by way of example passed through through-openings 31 in the holding devices 30 and through-openings 61 in the holding members 60 and connected with the supporting components 15.

The holding members 60 are, by way of example, configured as straps 62, having a flat rectangular cross section.

The holding members 60 have sections 63 without any teeth and sections 64 with a row of teeth 65. By means of teeth 66 in the row of teeth 65, the holding members 60 can be secured on the holding devices 30 in a form-fitting manner. The sections 63 are connected at their free end areas turned away from the holding devices 30 or the end areas not associated with the holding devices 30 in each case with the support base 11, in particular the supporting components 15. At that point there is in each case a through-opening 61.

The holding members 60 are by way of example made from a flexurally flexible plastic material, which can be wound around the wheels 121 and introduced into the holding devices 30, in order to secure the wheels 121 with respect to the support base 11.

The holding devices 30 comprise a holding base 32. The holding base 32 has, by way of example, an in particular plate-shaped base body 33, having an elongated design. The base body 33 comprises a fastening section 34, intended for fastening to the support base 11. The through-hole 31 is, by way of example, provided on the fastening section 34.

Wall sections 35 protrude from the base body 33, between which a guide channel 36 for the holding member 60 is formed. The wall sections 35 protrude, by way of example, approximately at right angles from the base body 33.

Guide bodies 37 are arranged on the wall sections 35 at a distance from the floor 38 of the guide channel 36, which protrude towards the respectively opposing wall section 35. The holding member 60 is guided in the gap between the guide bodies 37, which by way of example are configured in particular as short guide projections, and the floor 38 of the guide channel, in particular the side wall of the base body 33 between the wall sections 35. The guide bodies 37 ensure that a lateral surface 67 of the holding member 60 slides along the floor 38 of the guide channel 36 and can lift from the floor 38 only with little play. Thus, a relative gap between the row of teeth 36 and the floor 38 is predetermined, which improves the locking concept and feed concept of the fastening devices 20 explained in more detail later.

The holding members 60 can be introduced along a displacement axis V into the holding devices 30 or the guide channels 36 and slid into the holding devices 30. The displacement axis V corresponds to the longitudinal extension of the holding members 60 in the area of the holding devices 30.

In addition to the guidance by means of the guide bodies 37, guidance is advantageously present by means of guidance devices 40, which as it were are positioned downstream of the holding member 60 in front of the wall sections 35 or the guide bodies 37. By means of the guidance devices 40 expediently a free end area of a respective holding member 60 protruding in front of the holding devices 30 is guided. The guidance devices 40 comprise, by way of example, a guide channel 41, the free internal cross section contour 42 of which provides a guide contour 43 for guiding the holding member 60. The internal cross-section contour 42 corresponds to an external cross section contour 68 of the flexurally flexible holding member 60, so that this is guided secured against rotation in relation to the internal cross-section 42 or the guide contour 43. At this point it should be mentioned that the internal cross section contour 42 has a polygonal, in particular a flat rectangular design, corresponding to the polygonal, in particular flat rectangular, external cross section contour 68 of the holding member 60, so that at least in the area of its external corners it is guided secured against rotation.

The guide channel 41 is delimited from the base body 33 by floor area 44 associated with the lateral surface 67 or underside of the holding member 60. Side edges 69, in particular narrow sides, of the holding member 60, are guided between side walls 45 of the guidance device protruding from the base body 33, namely on their inner side turned towards the floor area 44. The side walls 45 or wall sections protrude, by way of example, at right angles from the base body 33.

Between the side walls 45 a guide body 46 extends, which is opposite the floor area 44. The guide bodies 46 could also readily have an interruption, meaning that, by way of example, from each of the side walls 45 a guide arm protrudes towards the other side wall 45 according to a segment of the guide body 46.

On its side turned towards the floor area 44, thus a guide surface, the guide body 46 in relation to the displacement axis V has in each case on either side a guide slant, namely a guide slant 47 and a guide slant 48. The teeth 46 can slide along the guide slants 47, 48, when the holding member 60 is displaced along the displacement axis V with respect to the guidance device 40 and/or holding device 30. The guide slants 47, 48 prevent the teeth 66 from catching with the guide channel 41. The guide slants 47, 48 have an inclination in the direction of the floor surface 44, meaning that they ensure that the holding member 60 slides along the floor surface 44 and/or can be easily introduced into the guide channel 41.

On the wall sections 35, and thus on the holding base 32, a locking element 51 of a locking device 50 is supported so that it can move between a locking position R and a release position E. By way of example, the locking element 51 comprises a locking lever 52, which engages with a form-fitting contour 53 in the teeth 36 or gaps between the teeth 36, if it adopts the locking position R.

The locking element 51 is, by way of example, by means of an axle element 54a, extending between the wall sections 35, of a locking element bearing 54, supported on the holding base 32 so that it can swivel about a swivel axis S1. The locking element 51 has, by way of example, an actuating arm 55, having a locking element operating area 57 for actuation by an operator, and a supporting arm 56, on the free end area of which the form-fitting contour 53, by way of example in the nature of a retaining tooth or retaining lug, is arranged. Through an actuating force K, for example a force on the locking element operating area 57, the form-fitting contour 53 is disengaged from the teeth or row of teeth 65, so that the holding member 60 is displaceable along the displacement axis V (FIGS. 10 and 7).

A spring arrangement 58, by way of example a leg spring, which is supported at one end on the holding base 32 and at the other on the locking element 51, works in the opposite direction from that for release, i.e. in the direction of the locking position R. The spring arrangement 58 support is, by way of example, identifiable in the perspective oblique views according to FIGS. 6-8.

For a rapid displacement of the holding member 60 along the displacement axis V with respect to the holding device 30 a feed device 70 is used, having an actuating device 71 for actuating a sliding element 72.

The sliding element 72 has a drive section 73, which serves for the friction-type or in this case form-fitting actuation and driving of the holding member 60.

The actuating device 71 comprises an actuating lever 74 for actuating the sliding element 72. The actuating lever 74 can be reached and manually actuated by an operator. The actuating lever 74 forms, by way of example, a component of a power transmission gear 74A, in particular a lever assembly 74B or a lever gear 74C.

The actuating lever 74 is supported by means of a lever-swivel bearing 75 on the holding base 32 so that it can swivel about a swivel axis S2. By way of example, an axle element 75a extends between the wall sections 35. The actuating lever 74 preferably has an actuating arm 76 and a drive arm 77, between which the swivel axis S2 runs. The actuating arm 76 is longer than the drive arm 72, so that a force amplification is possible.

The actuating arm 76 of the actuating lever 74 protrudes further from the holding base 32 than the actuating arm 55 of the locking element 51, representing a certain protection against incorrect actuation of the locking element 51.

It is also advantageously provided that the locking element operating area 57 and thus substantially the actuating arm 55 of the locking lever 52 is arranged in a space 78 of the actuating arm 76 of the actuating lever 74. In the locking position R, the actuating arm 55 of the locking element 51 protrudes on the side turned away from the holding member 60 in front of the actuating arm 76 from the actuating lever 74, so that it can be pushed against by a user with force K in the direction of the actuating lever 74, in order to release the locking device 50 or actuate it in the release position E. The space 78 is by way of example provided between arms 78a of the actuating lever 74.

In the area of the space 78 a recessed grip or actuating recess is preferably provided.

On an operating area 79 a fluting or other texturing 79a making gripping or actuation of the actuating lever 74 easier is expediently arranged.

By means of a sliding element swivel bearing 81 of a sliding element bearing 80, the sliding element 72 is supported on the actuating lever 74 so that it can swivel about a swivel axis S3. The sliding element swivel bearing 81 is positioned on the drive arm 77 of the actuating lever 74.

A bearing section 82 of the sliding element 72 is arranged between the arms 78a of the actuating arm 76 or of the actuating lever 74. The sliding element swivel bearing 81 is also located here. By way of example, an axle element 83 of the swivel bearing 81 runs between the arms 78a of the actuating lever 74.

A spring arrangement 84 loads the sliding element 72 in a direction away from the holding member 60. The spring arrangement 84 comprises, by way of example, a leg spring, which is passed through by the axle element 83. In this way, by way of example, in a starting position P1 of the actuating lever 74 (FIGS. 6 and 9) a gap 85 is present between the holding member 60 and the drive section 73 of the sliding element 72. The spring arrangement 84 has the effect of creating this gap 85. From a review of FIGS. 7 and 8 or 10 and 11, it can be seen that the actuating lever 74 starting from the starting position P1 (FIGS. 7, 10) in which the actuating arm 76 is adjusted towards the holding member 60, in particular its section 63, in a forward position P2 can be swivelled about the swivel axis S2, where it protrudes at an angle from the holding base 32, in particular its base body 33. The swivel path between these two swivel end positions of the actuating lever 74 is by way of example approximately 80-120°, in particular approximately 110°.

Through this swivelling movement of the actuating lever 74, a displacement movement B of the holding member 60 can be achieved. The sliding element bearing 80, comprising the sliding element swivel bearing 81 and the lever-swivel bearing 75, allows here a translational movement T of the drive section 73 of the sliding element 72. If the actuating lever 74 swivels about the swivel axis S2, the swivel axis S3 swivels between a position between the swivel axes S1 and S2 and a position outside of a gap between the swivel axes S1 and S2. The swivel bearing 81 swivels in a curve about the swivel bearing 75.

Here the sliding element 72, as can be seen by way of example from a review of FIGS. 10 and 11, moves forward like a slider or sliding paddle in the displacement direction B. The section of the sliding element 72 turned away or remote from the swivel axis S3 engages in the row of teeth 65 in a form-fitting manner, in order to in this way to push the holding member 60 forwards along the displacement axis V. This feed movement B is extremely effective and rapid, since, by way of example, through the swivel movement of the actuating lever 74 between the two swivel end positions P1 and P2 the holding member 60 is displaced over length of at least three of the teeth 66 relative to the holding base 32.

The teeth 66 have a sawtooth-like configuration and displacer slants 66a, along which the form-fitting contour 53 and/or form-fitting contours 87, 86 of the drive section 73 of the sliding element 72 can slide in a feed direction VR of the holding member 60.

Thus, by way of example, the holding member 60 can be pushed in the feed direction VR, wherein the locking element 51 is actuated through the displacer slants 66a of the teeth 66 in its release position E and/or the sliding element 72 disengages from the holding member 60.

The displacer slants are also advantageous for a return movement of the sliding element 72 in a return direction VL, counter to the feed direction VR, since the form-fitting contours 87, 86 of the sliding element 72 are able to slide along these, when the actuating lever 74 is swivelled back from position P2 to position P1 taking the sliding element 72 along with it in a return movement relative to the holding member 60. It is possible that in the process of this return movement, the drive section 73 is moved translationally, and thus approximately in the direction of the displacement axis V. However, it is also possible for the drive section 73 to swivel across at least a section of the return movement about the swivel axis S2.

However, if the drive section 73 of the sliding element 73 is moved in the feed direction VR, it engages in a form-fitting manner with two of the teeth 66 at a time, in order to actively displace the holding member 60 in the feed direction VR. By way of example, the form-fitting contours 87, 86 engage with the support edges 66b of the teeth 66.

The support edges 66b are supported when a force impinges on the holding member 60 counter to the feed direction VR on the form-fitting contour 53 of the locking element 51, so that the holding member 60 is supported against a tensile force Z impinging on the holding member 60 along the displacement axis V by the holding device 30.

The support edges 66b preferably run approximately at right angles to the displacement axis V.

The displacer slants 66a expediently run at an incline to the displacement axis V, in particular in an angular range of approximately 30-60°, particularly preferably of approximately 45°.

In the case of a force overload, for example in the event of an accident, a strong actuating force U (FIG. 12), is exerted in particular along the displacement axis V or at a flat angle of approximately 15-30° to the displacement axis V, on the actuating member 60, because the load or the bicycle 20 pulls correspondingly strongly on the holding member 60.

This actuating force U impinges via the form-fitting contour 53 on the locking element 51 and swivels the locking lever 72 or the locking element 51 as it were below the swivel axis S1 or about the swivel axis S1, wherein the actuating arm 55 swivels beyond its position associated with the release position E upwards and away from the base body 33. In this way an actuating contour 59 engages with an actuating contour 89 on an actuating arm 88 of the sliding element 72. The actuating arm 88 protrudes in front of the swivel axis S3, so that the actuating contour 89 or the actuating arm 55 of the locking element 51 swivels the sliding element 72 about the swivel axis S3 into a locking position or clamping position, in which the form-fitting contours 86, 87 engage in a form-fitting, expediently even clamping, manner with the row of teeth 65. Dual protection or a particularly effective locking and clamping of the holding member 60 relative to the holding device 30 is then possible if a particularly high load is applied to the holding member 60. In this case, by way of example in the event of an accident, it is not only the locking element 51, but also the sliding element 72, that ensures reliable retention of the holding member 60 on the holding device 30.

A link segment 39 of the holding base 32 extends between the locking device 50 and the feed device 70 on the one hand, and the guidance device 40. Here a gap 39a between the guidance device 40 and the other components of the holding device 30 is provided which serves as a working area or displacement area for the sliding element 72.

The segment 39 is expediently flexurally rigid or substantially flexurally rigid. Thus, the guidance device 40 and the locking device 50 and the feed device 70 are held secured against rotation relative to one another, so that the guide for the holding member 60, which provides the guidance device 40, optimally positions the holding member 60 also with respect to the locking device 50 and/or the feed device 70. If, therefore, by way of example a force impinges on the holding member 60 transversally to the displacement axis V and/or a torsional force acts about the displacement axis V, by way of example in the direction away from the floor 38, this force is as it were absorbed or withstood by the guidance device 40. Thus, the holding member 60 cannot have an effect transversally to the displacement axis V or in the sense of a torsion about the displacement axis V on, by way of example, the locking element 51 and/or the sliding element 72 and thus disengage these elements from the row of teeth 65.

It is also in line with the invention, therefore, if the guidance device 40, or another guidance device according to the invention, guides the respective holding member, for example the holding member 60, secured against rotation, with respect to a displacement axis, here the displacement axis V, so that the holding member in does not have an effect on the displacement direction and/or the feed device in all directions not corresponding to the displacement axis V.

The invention claimed is:

1. A fastening device for fastening a load to a load carrier of a motor vehicle, the fastening device comprising a holding member which is flexurally flexible at least in sections, and comprises a row of teeth, and a holding device for the tension-resistant holding of the holding member with respect to a feed axis, wherein, on a holding base of the holding device a locking element is mounted by a locking element bearing so as to be movable between a locking position and a release position, wherein in the locking position for locking the holding member with respect to the holding device, the locking element engages in a form-fitting manner with a form-fitting contour in the row of teeth and, in the release position, is disengaged from the row of teeth, wherein in the release position, the holding member is displaceable along the displacement axis with respect to the holding device, wherein feeding of the holding member along the displacement axis has a sliding element supported on the holding base of the holding device by a sliding element bearing with a translationally moveable drive section in contact with the holding member during a feed movement, and an actuating device having a manual operating area for manual operation of the sliding element.

2. A fastening device according to claim 1, wherein the sliding element is configured for an oscillating actuation of the holding member, wherein the drive section of the sliding element at least in engagement with the holding member performs a translational feed movement along the displacement axis.

3. A fastening device according to claim 1, wherein the actuating device has an actuating lever supported so that it can swivel on the holding base by a lever swivel bearing, on which the sliding element is supported so that it can swivel by a sliding element swivel bearing and/or in the form of a paddle.

4. A fastening device according to claim 1, wherein a locking element operating area provided for manual operation is arranged in or on a space of an actuating element of the actuating device for the sliding element.

5. A fastening device according to claim 4, wherein an actuating arm of the locking element is arranged in or on the space of the actuating element of the actuating device for the sliding element.

6. A fastening device according to claim 1, wherein the sliding element by means of the sliding element bearing and the locking element by means of the locking element bearing are supported on the holding base of the holding device so that they can move relative to one another and/or independently of one another.

7. A fastening device according claim 1, wherein the sliding element and the locking element have a coupled movement.

8. A fastening device according to claim 1, wherein the sliding element is spring-loaded in the direction of an external engagement position remote from the release position or in the direction of an engagement position with the holding member by a spring arrangement.

9. A fastening device according to claim 1, wherein the locking element is placed under load by a spring arrangement in the direction of the locking position.

10. A fastening device according to claim 1, wherein the row of teeth comprises teeth with a sawtooth configuration, having actuation slants for actuating the sliding element and/or the locking element in the direction away from the row of teeth or in the direction of a disengaged position.

11. A fastening device according to claim 1, wherein the locking element has an actuating contour for actuating the sliding element in a form-fitting engagement or clamping engagement with the holding member.

12. A fastening device according to claim 1, wherein the locking element through the holding member is actuated in a position that maintains the sliding element in a form-fitting engagement or clamping engagement with the holding member.

13. A fastening device according to claim 1, wherein the actuating device for force amplification of an actuating force of an operator has a power transmission gear, between an operating area of the actuating device and the drive section of the sliding element.

14. A fastening device according to claim 13, wherein the power transmission gear comprises a lever assembly or a lever gear.

15. A fastening device according to claim 1, wherein the holding member is releasably removable from the holding device in the release position of the locking element.

16. A fastening device according to claim 1, further comprising at least one guidance device for the holding member upstream or downstream of the locking element with respect to the displacement axis with a guide contour, which guides the holding member, secured against rotation, with respect to the locking element with respect to the displacement axis.

17. A fastening device according to claim 16, wherein the at least one guidance device guides the holding member transversally to the displacement axis (V) and/or has a guide channel, the internal cross section contour of which corresponds to an external cross section contour of the holding member.

18. A fastening device according to claim 16, wherein the at least one guidance device has at least one guide slant running at an incline to the displacement axis, in particular for impinging on free end areas of the teeth of the row of teeth or guiding the free end areas.

19. A fastening device according to claim 16, wherein between the guide contour and the holding base a space serving as a working area for the sliding element is arranged.

20. A fastening-device according to claim 16, wherein the at least one guidance device is integrally formed with the holding base.

21. A fastening device according claim 16, wherein between the at least one guidance device and the holding base a flexurally flexible or flexurally rigid link segment is provided to connect the guidance device and the holding base.

22. A fastening device according to any claim 1, wherein the holding member at least in the area of the row of teeth is configured as a strap and/or has a flat configuration.

23. A fastening device according to claim 1, wherein the fastening device forms a component of a load carrier.

24. A fastening device according to claim 1, wherein the holding member and/or the holding device is secured to a support component of a load carrier by a fastening device.

25. A load carrier with at least one fastening device according to claim 1.

26. A fastening device according to claim 1, wherein the fastening device forms a component of a rear load carrier.

27. A fastening device according to claim 1, wherein the holding member and/or the holding device is secured to a support component of a load carrier by a fastening bolt.

28. A rear load carrier for a motor vehicle, with at least one fastening device according to claim 1.

* * * * *